July 27, 1937.   R. HAFNER   2,088,413
HELICOPTER AND ROTATING WING AIRCRAFT
Filed March 21, 1935
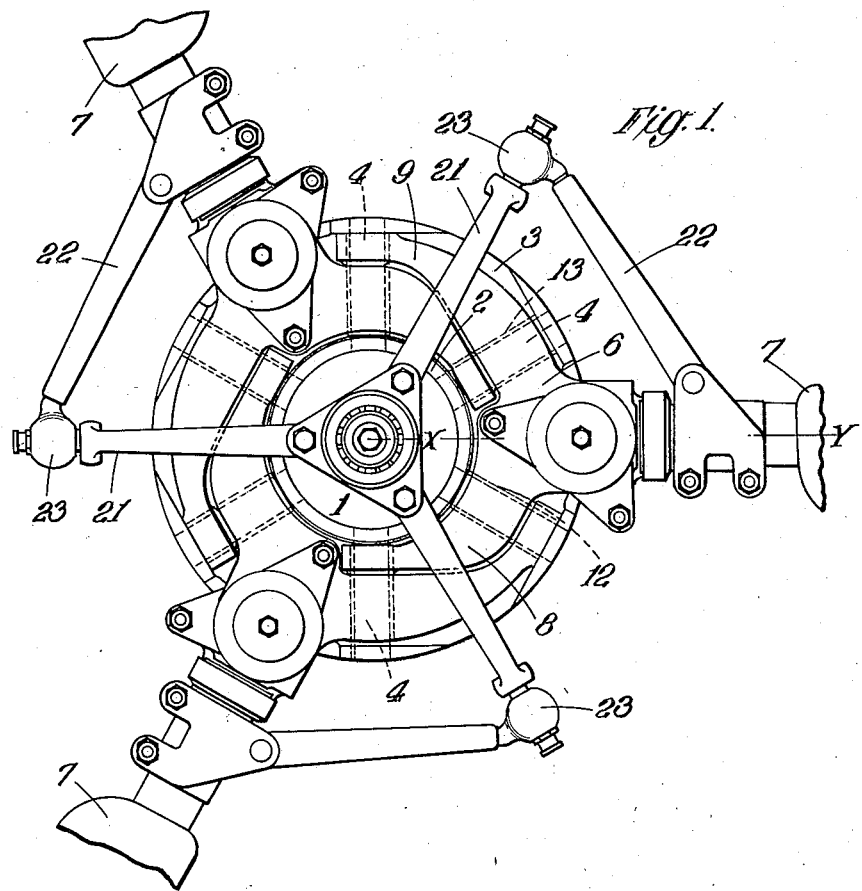
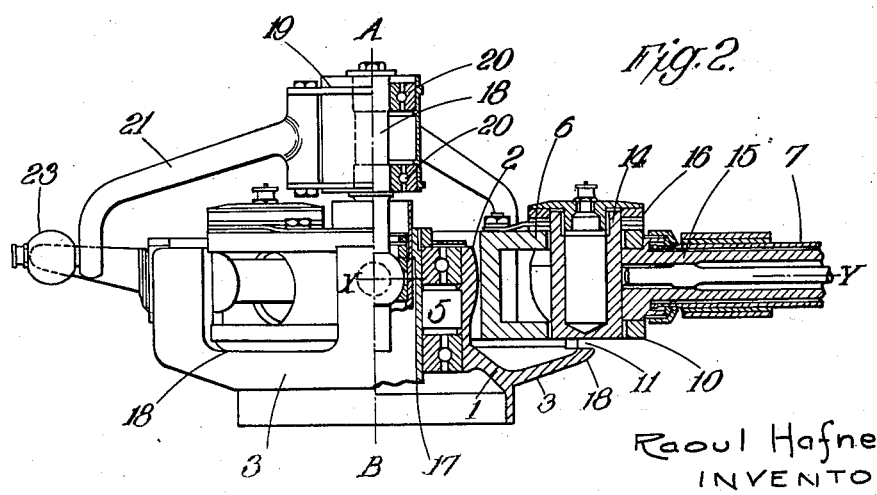
Raoul Hafner
INVENTOR
By Otto Munk
his ATT'Y.

Patented July 27, 1937

2,088,413

UNITED STATES PATENT OFFICE 2,088,413

HELICOPTER AND ROTATING WING AIRCRAFT

Raoul Hafner, Vienna, Austria

Application March 21, 1935, Serial No. 12,127
In Great Britain March 29, 1934

7 Claims. (Cl. 244—17)

This invention relates to helicopter and rotating wing aircraft having three or more blades capable of flapping at their roots about axes transverse to the axis of rotation of the wing system. When such flapping axes do not intersect with the axis of rotation a continually changing torque, transverse to the axis of rotation, is exerted by the flapping blades. This uneven torque places a continuously varying load upon any mechanism controlling the inclination either of the blades themselves or of the axis of rotation of the said blades and makes the control of such machines heavy, laborious, or difficult.

It has previously been proposed in rotating wing aircraft having two blades only to pivot both blades on a common axis which intersects the axis of rotation, and it has further been proposed in rotating wing aircraft to pivot two or more blades on axes each intersecting the axis of rotation but displaced axially from each other, necessitating the cranking of the blades to obviate heavy centrifugal couples.

The primary object of this invention is to lighten the control of such machines while allowing the blades to flap freely in order to stabilize the machine and at the same time to free themselves from severe bending stresses.

According to the invention, helicopter and rotating wing aircraft of the kind first hereinbefore set forth, have the roots of the blades pivoted to the central hub member so that the flapping axes of the blades intersect, or nearly intersect one another and also the axis of rotation of the said hub member.

Each blade is pivoted to the hub member by a fork having prongs set at unequal distances from the longitudinal axis of the blade so that adjacent prongs of adjacent blades interlap one within and one without the other alternately around the circumference of the hub. The prongs are preferably provided with holes or slots through which the pivots of adjacent prongs are passed with sufficient clearance to permit the necessary flapping motion. Alternatively the prongs may be sufficiently offset to clear the pivots of adjacent prongs.

The blades are mounted in the shanks of the forks so as to be capable of a rocking motion about axes parallel to the axis of rotation. Each blade may also be mounted so as to be capable of a rocking motion about its longitudinal axis and may be provided with a radius rod to enable its inclination to be controlled or varied.

Preferably these radius rods are controlled by a spider rotatably mounted upon a control column co-axial with the axis of rotation of the rotating wing system.

The said radius rods and spider are preferably universally connected together in a plane somewhat above the plane of the pivoting axis of the blades in order that an upward motion of the blades on the advancing side of the machine will cause less decrease of inclination of the blades than a corresponding downward motion, on the rearward moving side of the machine, will cause an increase of inclination of the blades.

The invention will now be described with reference to the accompanying drawing, wherein:

Figure 1 shows a plan of the central hub mechanism and

Figure 2 a part sectional side view with part of the mechanism removed.

The hub 1 is turned to provide bearings in two rings 2, 3 for the flapping bolts or pivots 4. The inner ring 2 serves also to hold the main ball races 5 and the outer ring 3 encloses the Cardan members or forks 6 forming the roots of the blades 7. Each fork 6 has two arms or prongs 8, 9 set at different distances from the longitudinal axis X, Y of the corresponding blade 7 so that the inner prong 8 follows the outside curve of the inner ring 2 and the outer prong 9 follows the inside curve of the outer ring 3.

The hub 1 is preferably provided with three blades 7 and this odd number permits the three forks 6 to be so fitted into the space between the two rings 2, 3 that only the forked shank portion 10 of the said forks emerges from the said hub through gaps 11 in the outer ring 3. The flapping bolts 4 are inserted in the rings 2, 3 so that their axes intersect with the axis A, B of the hub 1. Each fork 6 rocks about two co-axial bolts 4. The prongs 8, 9 are provided respectively with clearance holes 12, 13 to clear the bolts 4 of the adjacent interlapping prongs. It will be seen that in the event of one of the flapping bolts 4 of a blade failing, the corresponding bolts of the adjacent blades will prevent the said blade from breaking free from the hub 1. The prongs 8, 9 may be provided with slots in place of the holes 12, 13 or they may be suitably offset from the flapping axes so as to clear the flapping bolts of the adjacent prongs. The forked shank portions 10 of each flapping fork 6 is connected by a rocking bolt 14 to a member 15 carrying the blade 1. Any suitable friction device 16 may be provided to damp the motion of the rocking bolt 14.

The main ball races 5 are mounted upon a fixed member or mast 17 connected to the body of the machine. The hub member 1 is provided with a flange 18 which serves as a stop to support the blades when the machine is at rest on the ground.

The machine is controlled by varying the inclination of the blades either as a whole or differentially by means of a control column 18 coaxial with the axis of the hub 1 and slidably and rockably mounted within the fixed member or mast 17.

A spider 19 is rotatably mounted upon the end of the column 18 by means of ball races 20 and the arms 21 of the said spider are universally connected to radius arms 22 on the blades by a universal joint 23 in a plane situated at a distance somewhat above the plane of the flapping axes as shown in Figure 2.

What I claim and desire to secure by Letters Patent of the United States is:—

1. In a rotary wing aircraft the combination, with a rotary hub member, of a plurality of blades extending substantially radially outwards therefrom and respectively articulated thereto about transverse flapping axes intersecting each other and the rotary axis of said hub member at substantially a single point, a central boss and an outer ring carried by said hub member coaxially therewith, and forks at the inner ends of said blades each embracing said rotary axis and pivoted by its arms about one of said flapping axes, said forks lying in the annular space between said central boss and said outer ring in mutually overlapping relationship, each with its arms respectively radially inside and outside their neighbours and pivotally attached to points on said boss and said ring respectively.

2. In a rotary wing aircraft the combination according to claim 1, and in which said outer ring is cut away between the points of pivotal attachment thereto of the radially outer of said arms to give flapping clearance to the bases of said forks.

3. In a rotary wing aircraft the combination, with a rotary hub member, of more than two blades extending substantially radially outwards therefrom and respectively articulated thereto about individual transverse flapping axes intersecting each other and the rotary axis of said hub member at substantially a single point, a central boss and an outer ring carried by said hub member coaxially therewith, pivot pins extending radially in diametrically opposite pairs between said boss and said ring to form said flapping axes, and forks at the inner ends of said blades each embracing said rotary axis and pivoted by its arms about one of said flapping axes, said forks lying in the annular space between said central boss and said outer ring in mutually overlapping relationship, each with its arms respectively radially inside and outside their neighbours, each of the radially inner of said arms being cut away intermediately in its length to give flapping clearance to the pivot pin upon which its outer neighbour is pivoted, and said outer ring being cut away at intervals to give flapping clearance to the bases of said forks.

4. In a rotary wing aircraft the combination, with a rotary hub member, of a plurality of blades extending substantially radially outwards therefrom and respectively articulated thereto about transverse flapping axes intersecting each other and the rotary axis of said hub member at substantially a single point, radius arms projecting from the said blades, and a central control member articulated separately to said radius arms and universally tiltable about the said single intersection point for cyclically varying the pitch angles of said blades.

5. In a rotary wing aircraft, the combination according to claim 4, and in which the points of articulation of said central control member to said radius arms lie in a plane which intersects the rotary axis of the hub member above the point of intersection of the said flapping axes therewith.

6. In a rotary wing aircraft, the combination according to claim 4, and in which said central control member is slidable along the rotary axis of said hub member for adjusting the pitch angles of said blades similarly and simultaneously.

7. In a rotary wing aircraft the combination, with a rotary hub member, of a plurality of blades extending substantially radially outwards therefrom and respectively articulated thereto about transverse flapping axes intersecting each other and the rotary axis of said hub at substantially a single point, and a central control member for cyclically varying the pitch angles of said blades and tiltable for that purpose substantially about the said single intersection point.

RAOUL HAFNER.